United States Patent [19]

Hawkins

[11] 4,302,666

[45] Nov. 24, 1981

[54] POSITION CONTROL SYSTEM OF THE DISCONTINUOUS FEEDBACK TYPE

[75] Inventor: Patrick J. Hawkins, Bellevue, Wash.

[73] Assignee: The Boeing Company, Seattle, Wash.

[21] Appl. No.: 93,206

[22] Filed: Nov. 13, 1979

[51] Int. Cl.³ .......................... F41G 3/22; G05D 3/20
[52] U.S. Cl. .................................. 235/404; 89/1.815; 89/41 LE; 235/411; 318/592; 318/594; 364/423
[58] Field of Search ................ 364/423; 235/411, 412, 235/404; 318/584, 590, 592, 594, 596, 601, 608; 89/1.8, 1.815, 41 LE, 41 ME, 41 M

[56] References Cited

U.S. PATENT DOCUMENTS

| | | | |
|---|---|---|---|
| 3,239,735 | 3/1966 | Raider et al. | 318/601 |
| 3,309,963 | 3/1967 | Salomonsson | 364/423 X |
| 3,600,659 | 8/1971 | Danchuk | 318/608 |
| 3,904,945 | 9/1975 | Hassan et al. | 318/594 X |
| 4,021,714 | 5/1977 | Jones et al. | 318/594 |
| 4,028,604 | 6/1977 | Togo et al. | 318/596 |
| 4,118,774 | 10/1978 | Franke | 318/590 X |
| 4,166,406 | 9/1979 | Maughmer | 364/423 X |

*Primary Examiner*—Felix D. Gruber
*Attorney, Agent, or Firm*—Christensen, O'Connor, Johnson & Kindness

[57] ABSTRACT

A position control system is disclosed for aiming a mobile rocket launcher having positionable axes in the azimuth and elevation planes. The control system has a separate control subsystem for each axis of movement, and each such subsystem includes an initial aiming signal processor providing a course positioning function and a reaiming signal processor providing a fine positioning function. The initial aiming processor receives signals representing a desired position (DP), a feedback signal representing the actual position (AP) updated at predetermined sampling intervals, and an error signal (E) representing the difference between DP and AP. From signals representing AP and E, and a constant representing the stopping time of the launcher mechanism for a given control axis, the initial aiming processor produces a predicted position signal (PP) which represents the position that the launcher will reach upon termination of the actuator drive for that axis. The signal PP is then compared with the signal representing DP and depending upon a predetermined relationship between the predicted and desired positions of the launcher an actuator control signal is generated for driving the associated actuator at either a full forward or full reverse speed, or stopping and braking the associated launcher mechanism. The reaiming processor incorporates an error averaging network and an actuator signal function generator. The former averages, over a given time interval, the magnitude and direcilton of the error signal E, and the latter is responsive to the time average error (AE) to generate a forward or reverse actuator drive signal for an incrementally variable duration $T_c$, that increase or decrease with the magnitude of AE and is timed to remove any remaining error in the position of the launcher for the given control axis. The reaiming processor is reactivated after each rocket launching to reaim the launcher to correct for any disturbance to its original position caused by the firing recoil, and the correlation provided by the function generator between the average error AE and the signal duration $T_c$ is updated from time to time to compensate for varying actuator drive characteristics due to wear and environmental conditions.

15 Claims, 9 Drawing Figures

POSITION CONTROL SYSTEM OF THE DISCONTINUOUS FEEDBACK TYPE

BACKGROUND OF THE INVENTION

The invention relates to position control systems of the discontinuous feedback type.

Although the invention disclosed herein can be used in a variety of control applications, it has particular utility as a system for aiming a positionable weapon such as a mobile rocket launcher, and then repetitively reaiming the weapon after firing each shell or rocket. Mobile weapons, such as the subject rocket launcher, are designed to be moved from site to site such as from a concealed location to a firing location, and upon arriving at each new firing site, the weapon must be capable of being rapidly positioned, aimed and fired. Moreover, after each round is fired, the weapon must be rapidly reaimed to correct for shifts in its positioning that result from the recoil or other transient reaction to the launched rocket or fired shell.

Known closed loop control systems having continuous feedback between the actual position of the controlled mechanism and the desired position commanded by an input signal, require an excessive amount of energy, usually in the form of electrical power, to drive the mechanism at full power consuming levels, continuously until the error signal has been nulled. Thus, the power drain is substantial, even when only small deviations remain between the actual and desired positions of the mechanism. For an electromechanical system of a size and mass suitable for positioning a large, heavy rocket launcher or artillery piece, the substantial inertia and friction forces associated with aiming the weapon require exceptionally high levels of electrical power to achieve even small position corrections.

Furthermore, in a control system that must be successively activated after each fired round in order to reaim the weapon due to physical displacement caused by the recoil, the high level power consumption of a continuous feedback control system is multiplied by the number of times that the weapon must be reaimed during a multiple round firing sequence.

Also, continuous feedback control systems otherwise suitable for the foregoing purpose, commonly involve circuitry of such complexity that reliability, repair and replacement become factors which significantly detract from their overall effectiveness. Usually, as in the case of the embodiment of the invention disclosed herein, the positioning system will involve at least two axes of positionable movement. To develop a control system of the continuous feedback type for controlling two or more axes, additional complexities are encountered in providing a system which is immuned to cross-coupling of signals between the separately controlled axes. Cross-coupling of control signals can be minimized to a certain extent by positioning the separate axes in succession. However, this increases the amount of time needed to initially aim the weapon and to reaim the weapon after firing each round.

Accordingly, one object of the invention is to provide a control apparatus and method for positioning a controlled mechanism characterized by the capability of accurately and rapidly positioning the mechanism while consuming substantially less power than required to operate a closed loop, continuous feedback control system of comparable response time and final position accuracy.

Another object is to provide such an apparatus and method for aiming and, in succession, reaiming a rocket launching or artillery weapon, wherein the reduced power consumption is particularly beneficial because of the need to reaim the weapon after each round is fired.

Another object of the invention is to provide such an apparatus and method suitable for use in controlling two or more positionable axes of a weapon aiming mechanism, in which the degree of cross-coupling of control signals between the separate axes is reduced to a negligible amount. A related object is to provide such minimal cross-coupling of signals between the controls that govern the axes of movement such that two or more axes can be controlled concurrently to obtain a final positioning of the weapon in the least amount of time.

Another object of the invention is to provide a control system of the above-characterized type, which is capable of achieving considerable accuracy in the aiming of the weapon without involving the complexities and inherent reliability and servicing problems of a continuous feedback positioning system.

SUMMARY OF THE INVENTION

In accordance with the method and apparatus of the invention, each axis of controlled movement of a positionable mechanism is provided with an associated actuator which operates upon command in a forward discrete speed mode, a reverse discrete speed mode or a stop-braked mode. The actuator for each controlled axis is governed by an actuator drive control incorporating first and second signal processors which cooperate in succession to produce a combined output signal that selectively disposes the actuator in one of the above-mentioned operating modes. The first and second signal processors are responsive to signals representing a desired position (DP), an actual position (AP) and an error (E) equal to the sense and magnitude of the difference between the DP and AP signals. The processors operate in succession, with the first processor performing a coarse positioning of the associated axis of the controlled mechanism, and the second processor operating thereafter to improve the initial, coarse positioning, if needed. Additionally, after the initial positioning of the mechanism, the second signal processor is, in one preferred form of the invention, reactivated after each disturbance to the mechanisms position, to correct therefor, such as following the firing of each rocket or artillery shell in a weapon aiming control system.

The first signal processor, which functions in the preferred form of the invention as an initial or coarse aiming control, compares the DP signal with a time changing predicted position signal (PP) representing the actual position (AP) plus a stopping distance factor. This factor is computed from a measured rate of approach toward the desired position and a predetermined time interval representing the reaction time of the control and controlled mechanism when the associated actuator is commanded to change from one of its discrete speed modes to the stop-braked mode. In response to the above-mentioned comparision of signals, if it is determined that the predicted position (PP) lies within a predetermined deadband (+d) of the desired position (DP), an actuator drive signal from the first processor causes an abrupt transition of the actuator to the stop-braked mode. The mechanism is rapidly decelerated to a stopped condition and will remain in that condition until the second signal processor acts to improve this initial positioning.

The second signal processor incorporates an averaging subprocessor for averaging the error signal (E) over a predetermined time interval, and a function generator responsive to the time averaged error signal (AE) to generate a position improving and reaiming actuator drive signal. This follow-up signal has a discrete level and is of the proper polarity for correcting the average error, and last for a duration that varies incrementally as a function of the magnitude of the averaged error. Thus, after the initial positioning by the first signal processor, the function generator of the second processor produces an actuator drive signal capable of disposing the actuator in either of its forward or reverse modes, depending upon the polarity of the averaged error and maintains the appropriate speed mode for an incrementally variable duration precorrelated to displace the mechanism by an amount and in a direction sufficient to remove the error AE which should closely match the steady state offset from the desired position DP.

In a preferred form of the invention, the first signal processor functions to perform an initial or coarse aiming of each control axis of a positionable weapon, such as a rocket launcher or artillery piece, and the second signal processor is effective to improve the initial aim performed by the first processor, prior to firing, and to thereafter, in succession reaim the weapon after each round is fired to correct for disturbance of the weapon's position, resulting from recoil and other firing transients.

Also in the preferred form of the invention, the actual position (AP) and associated signal is monitored at predetermined sampling intervals, rather than continuously. Similarly, transitions in the actuator drive signals produced by the first and second processors, are constrained to predetermined clock times, which may be the same as, or different from the actual position sampling times. When the actual position (AP) is sampled in this manner, the first signal processor, in developing the predicted position (PP) signal computes the stopping distance by first measuring the rate at which the mechanism is approaching the desired position and then multiplies this approach rate by a predetermined time factor $\Delta s$ representing the total response time of the system, including signal computation time, before the mechanism is brought to a complete stop. The distance traveled during this stopping time $\Delta s$, is added to the sampled actual position (AP) to develop the predicted position signal (PP). As stated above, it is the predicted position signal (PP) that is compared with the desired position (DP) to determine when the output signal from the first processor should command the associated actuator to assume the stop-braked mode.

Further still in the preferred form of the invention, the averaging function of the second signal processor is activated for a predetermined time interval following the firing of a rocket or shell, so as to determine the average error during the presences of transient natural oscillations of the weapon's spring-mass system. By averaging out these oscillations, an accurate average error (AE) signal can be produced and applied to the function generator for initiating the reaim correction before the transients that occur in reaction to the recoil have died out.

In accordance with still another aspect of the preferred form of the invention, the actuator drive function generator of the second signal processor is uniquely updated from time to time to insure that the input/output response of the generator conforms to long term changes in the actuator drive characteristics and its braking characteristics. These relatively long term changes will occur as a result of wear and environmental influences. Additionally, when the actuator is replaced, different drive and braking characteristics will exist necessitating the regeneration or updating of the function generator's input/output characteristics.

To provide a complete disclosure of the invention, reference is made to the appended drawings and following description of one particular and preferred embodiment.

DETAILED DESCRIPTION

Figure 1:
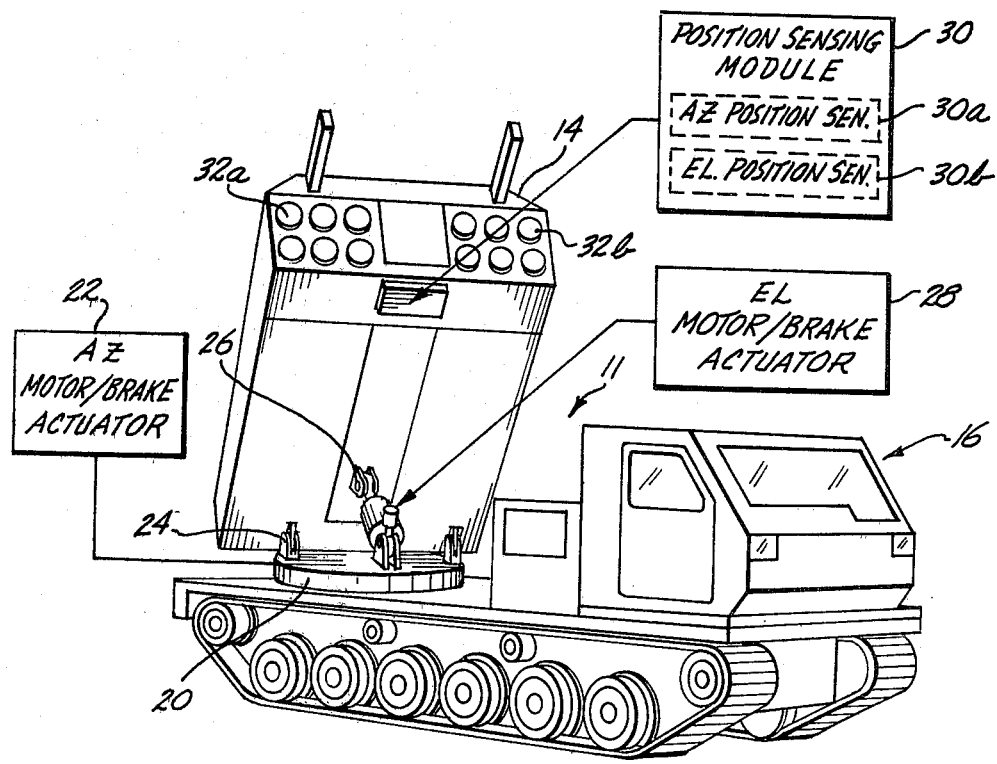
FIG. 1 is a perspective view of a mobile rocket launcher incorporating the positioning control system of the invention.
Figure 2:
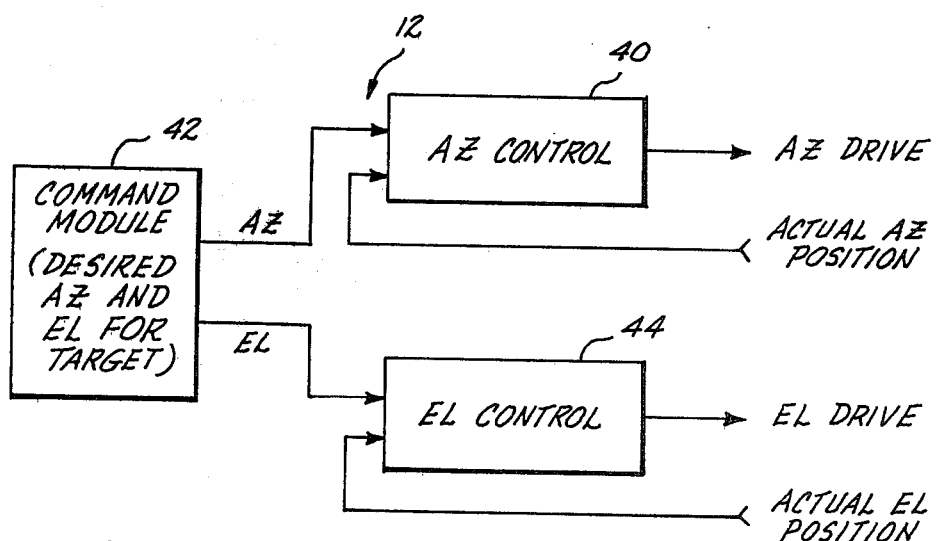
FIG. 2 is a generalized block diagram of a two axes position control system of the invention for the mobile rocket launcher shown in FIG. 1.

The position control system of the invention is disclosed herein by reference to its use in aiming a mobile rocket launcher 11 as shown in FIG. 1. FIG. 2 illustrates, in a generalized manner, the control system 12 of the invention for controlling the position of a swivelable and tiltable receiver 14 mounted on a tractor 16 so that receiver 14 is positionable in the azimuth (horizontal) and elevational planes. For this purpose, receiver 14 is mounted on a turntable 20 which is controllably rotated in the horizontal plane by an azimuth motor/brake actuator 22; and is tilted in elevation about a tilt axis 24 by an extendable ram 26 incorporating an elevation motor/brake actuator 28. Turntable 20, supporting the entire assembly is in turn mounted for rotation about a vertical axis on the bed of tractor 16. Carrier 14 also incorporates a position sensing module 30, such as may be provided by available inertial sensing systems of the type that automatically determines the actual position of carrier 14 with respect to a pre-established reference point. More particularly, module 30 is capable of generating at periodic sampling times, signals representing the actual position $AP_{AZ}$ of receiver 14 in the azimuthal plane, and the actual position $AP_{EL}$ in the elevational plane.

The rockets for launcher 11 are factory assembled in pods 32a and 32b, holding six rockets each, and having an elongate shape of rectangular cross section suitable for being inserted in conforming openings provided in receiver 14. Overhead tract assemblies 34 are provided for assisting in the loading of unfired pods into receiver 14, and unloading spent pods from the receiver.

As explained more fully hereinafter, actuators 22 and 28 each incorporate an electrically energized motor and a cooperating electrically controlled brake, and provide forward and reverse modes of predetermined constant speed and a stop-braked mode. The associated control signal for each of actuators 22 and 28 is a three level signal that provides for driving the associated actuator either in a forward direction at a constant speed, or a reverse direction at a constant speed; or stopping and braking the actuator and the associated launcher mechanism. In the case of turntable 20, the forward direction of actuator operation merely refers to one direction of rotation of the turntable, while the reverse mode refers to the opposite direction of rotation. Similarly, for elevation actuator 28, the forward mode refers to elevating receiver 14 by rotating it about pivot axis 24, while the reverse mode refers to lowering the receiver. While reference is made herein to operating actuators 22 and 28 to drive the launcher mechanism to a desired position, in this particular embodiment the displacements by actuators 22 and 28 are measured in angular radians or milliradians.

In FIG. 2, control system 12 is shown to incorporate a separate control subsystem for each axis of movement of receiver 14 of rocket launcher 11. Thus, an azimuthal control 40 has an output for driving actuator 22 in response to input signals representing the desired azimuth position $DP_{AZ}$ received from a command module 42 and the actual azimuth position $AP_{AZ}$ from position sensing module 30. Similarly, a separate elevation control 44 is provided for operating elevation actuator 28 in response to input signals representing the desired elevation $DP_{EL}$, received from command module 42, and actual elevation position $AP_{EL}$, received from sensing module 30. While the desired position signals for the azimuthal and elevational planes may be from any suitable originating source, and in this instance module 42 generates these desired position signals in order to aim rocket carrier 14 of launcher 11 at a predetermined distant target. The rockets launched from pods 32a and 32b are not, in this case, of the self or remotely guided kind, and thus the accuracy of the hit is determined by the precision with which receiver 14 can be aimed at the intended target, taking into account the known trajectory characteristics and ballistics of the launched rockets. In response to the desired azimuth and elevation positions, controls 40 and 42 operate concurrently to rotate receiver 14 by means of turntable 20 and lift the exit end of carrier 14 relative to the bed of launcher 11 until the position sensing module 30 determines that the actual azimuth and elevation positions match the desired or commanded positions generated by module 42.

Figure 3:
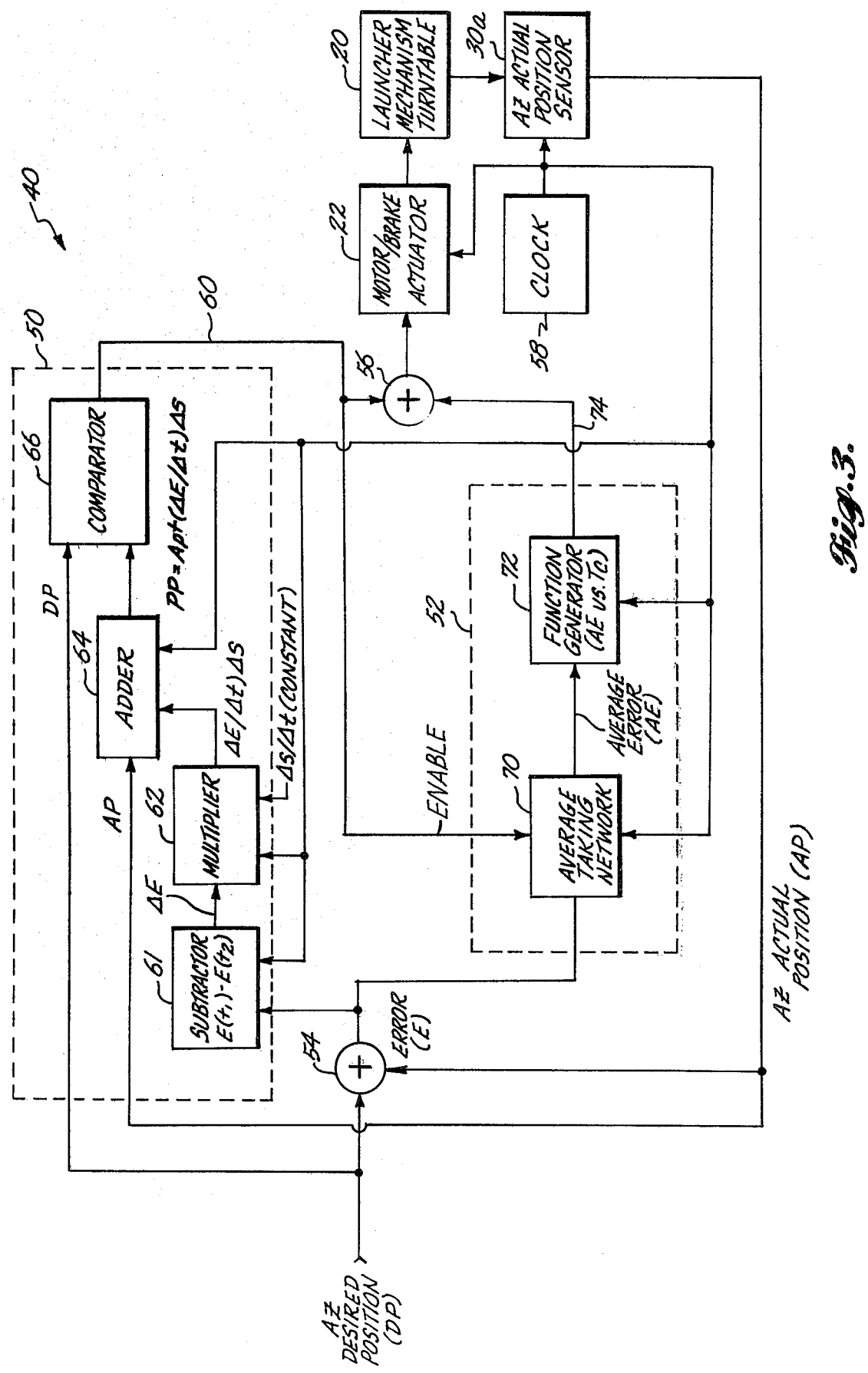
FIG. 3 is a more detailed and comprehensive block diagram of the control subsystem for one of the controlled axes of the positioning system shown more generally in FIG. 2.

The unique principles of the invention are incorporated in controls 40 and 44 of system 12, and since these controls are essentially the same, only the azimuth control 40 is shown in the detailed block diagram of FIG. 3. With reference to FIG. 3, azimuth control 40 includes a first signal processor 50 which effects a coarse positioning of the controlled mechanism, or in this embodiment, an initial aiming of receiver 14 of launcher 11; a second signal processor 52 which operates after processor 50 and improves and provides repetitive fine correction of the initial positioning achieved by processor 50; an input stage consisting of a summing junction 54; and an output stage including another summing junction 56, the associated motor/brake actuator 22 for the azimuth drive, the launcher azimuth mechanism in the form of turntable 20 and the azimuth actual position sensor 30a. In the preferred implementation of control 40, described in greater detail hereinafter, the various functions of control 40 are implemented by a digital processor and for this purpose a clock 58 generates a stream of timing pulses which are fed to actuator 22, sensor 30a and signal processors 50 and 52 for establishing the rate and phase at which the actual position is updated, i.e., sampled, the times at which actuator 22 can be energized, and to facilitate certain other timing operations that occur in processors 50 and 52.

The following notations are used to identify and distinguish the various signals that occur in control 40 during its operation:

DP—Desired Position (AZ)
AP—Actual Position (AZ)
E—Error or difference between DP and AP
AE—Average Error
PP—Predicted Position equal to $AP+(\Delta E/\Delta t) \Delta s$
$\Delta t$—Sampling Interval
$\Delta s$—Predetermined stopping time constant
$\Delta E$—Measured change in error E over the sampling interval $\Delta t$
$\pm d$—Deadband Parameter associated with operation of processor 50
$T_a$, $T_b$, $T_c$, and $T_d$—Time Parameters associated with operation of processor 52
$\pm \delta_o$—Deadband Parameter associated with the operation of processor 52

The first or coarse positioning processor 50 receives signals representing DP, AP and E. The signal representing E (or error) is produced by summing junction 54 which takes the difference between the DP signal and the AP signal. Since the actual position or AP signal will be updated only at the clock rate established by clock 58, it is observed that the error signal (E) will be similarly updated at the clock rate. This rate or time will be referred to as the sampling time and the interval between consecutive sampling times will be referred to as the sampling interval. Processor 50 also receives the clock pulses produced by clock 58, and receives a signal representing the constant stopping time factor $\Delta s$ divided by the sampling interval $\Delta t$ (also a constant in this embodiment).

These various signals are processed to produce an output signal on output lead 60 for driving actuator 22 via summing junction 56 until the launcher mechanism turntable 20 approaches within a predetermined offset from the desired position, taking into account the stopping time of the mechanism. For this purpose, processor 50 includes a digital subtractor 61, a digital multiplier 62, a digital adder 64 and a digital comparator 66. From summing junction 54, subtractor 61 receives the error signal E, representing the difference between the desired position DP and the actual position AP, updated each time clock 58 produces a pulse causing sensor 30a to update the last actual Az position. In response to successive error signals, subtractor 61 produces at its output a signal representing $\Delta E$ representing the change in the error between successive sampling times $t_1$ and $t_2$.

Digital multiplier 62 multiplies ΔE by a constant factor equal to Δs/Δt. The quantity ΔE divided by Δt represents the rate at which the mechanism is approaching the desired position. Δs represents a predetermined stopping time taking into account the reaction time of the electronic circuitry, the reaction time of the actuator to a change in the control signal at output lead 60, and the deceleration time of the mechanism in response to the deenergization of the motor and energization of the actuator brake. By multiplying Δs times the calculated rate of approach ΔE/Δt, the output of multiplier 62 produces a signal reflecting the additional travel of the mechanism following a transition of the signal output to actuator 22 between either a full speed forward or reverse signal level and a stop-braked level.

Digital adder 64 receives the periodically updated actual position signal AP and adds this signal to the projected additional travel of the mechanism represented by (ΔE/Δt) Δs. The result is a predicted position signal PP equal to AP plus (ΔE/Δt) Δs. The predicted position signal is applied as one input to digital comparator 66 for comparing the predicted position PP with the desired position DP applied as the other comparator input. When comparator 66 determines that PP lies within a predetermined differential ±d of DP, the output signal on comparator 60 switches from a full forward or reverse command signal level to a stop-braked signal level. Actuator 22 responds to this signal transition through summing junction 56 and instantly, or nearly so, de-energizes the actuator motor and operates the actuator brake causing turntable 20 of the launcher mechanism to decelerate to a complete stop. When turntable 20 stops, its position should be (it is now always) within ±d of the desired position. This initial positioning of mechanism 20 by signal processor 50 is referred to as an initial Az aiming of the launcher mechanism. While the various digital components of processor 50 may be provided by any of various known circuit designs, the preferred implementation is by way of a programmed microprocessor based computer as disclosed more fully hereinafter. During the foregoing operation, a corresponding processor in control 44 operates to achieve an initial aiming of the launcher in the elevation plane.

To improve the initial aiming and to reaim turntable 20 as needed, the second signal processor 52 of Az control 40 is connected in parallel with processor 50 between summing junctions 54 and 56, and is operated in a sequential fashion after processor 50 has achieved the initial aiming. Processor 52 incorporates an average taking network 70 and a function generator 72. Network 70 is enabled after the processor 50 achieves the initial aiming of the mechanism turntable. When enabled, network 70 receives the error signal E from summing junction 54 and functions in a manner more fully described below, to sum a plurality of the updated or sampled values of E over a predetermined averaging time interval, and then divide the thusly summed error values by the predetermined time interval to produce a time averaged error signal AE. While network 70 may be provided by any number of known averaging circuits, and signal processors, a preferred implementation is by way of programming a general purpose computer, and more particularly, a programmable microprocessor based computer, in the manner described hereinafter. Also, as more fully described herein, the average error AE is computed over a time interval that is selected to average out transient oscillations of the launcher position resulting from abrupt movement of the launcher such as during the initial set up and aiming procedures, and more especially, transients which occur in reaction to the firing of each rocket.

The thusly computed average error AE is applied as an input to function generator 70 which, depending on the polarity and magnitude of the average error AE, generates a timed actuator correction signal at an output 74. This actuator correction signal has three discrete levels (corresponding to forward, reverse and stop-braked actuator modes) and, in this respect, is the same as described above for the drive signal produced at the comparator's output 60 of the first signal processor 50. However, unlike the output of processor 50, the drive signal developed at the output 74 of function generator 72 is generated only for a computed time interval $T_c$ equal to an integral multiple of a predetermined minimum time unit, where the number of such units varies as a function of the magnitude of the average error AE. In the particular implementation described hereinafter, the minimum time unit corresponds to the sampling interval Δt established by clock 58. Thus, function generator 72 provides a stair step relationship between the measured AE and the duration $T_c$ of the needed corrective actuator signal. The polarity of the drive signal at output 74 will correspond to the polarity of the average error AE input to generator 70. The total duration $T_c$ of the drive signal is, by prior correlation, effective to advance or reverse the turntable 20 via summing junction 56 and actuator 22 by an amount sufficient to remove the computed average error AE. Preferably, function generator 72 is like averaging network 70, implemented by programming a microprocessor based computer and incorporates an adaptive generation capability for updating the AE versus $T_c$ characteristics as needed in a manner more fully described hereinafter.

As mentioned, the elevation control 44 has basically the same construction as control 40, and operates concurrently therewith to drive EL actuator 28 to achieve the commanded lift of receiver 14. One difference does exist, however, in the second processor of EL control 44, corresponding to processor 52 of control 40, wherein a variable gain amplification function is provided between the average taking network (corresponding to network 70) and the function generator (corresponding to generator 72) to correct for the otherwise lack of linearity between the angular rotation of receiver 14 and the lengthwise telescoping of actuator 28. Such variable gain amplification is controlled by the actual EL position signal $AP_{EL}$ to cause a change in gain of the AE signal as a function of $AP_{EL}$ for providing linear operation of this portion of the EL control. The initial aiming processor of control 44 (corresponding to processor 52) is constructed and operates the same as processor 52 as the coarse EL positioning of this portion of the control is not adversely affected by abovedescribed non-linearity.

OPERATION

The functioning of control 40 of FIG. 3 will be explained by reference to a typical operating sequence illustrated by the waveforms shown in FIGS. 4 and 5. In the example shown in FIG. 4, it is assumed that control 40 has been commanded to drive the launcher turntable 20 to a new desired position DP in the azimuthal plane. It will be further assumed, that the present or actual position of turntable 20, as determined by position sensor 30a, is such that turntable 20 must be rotated in a forward direction by actuator 22 to reach the commanded DP. Under these conditions, the difference between the desired position DP and the predicted position PP, as computed by processor 50 of control 40, exceeds the pre-established deadband d and, as a consequence, output lead 60 of control 40 produces the waveform shown in FIG. 4 for the output of comparator 66. As depicted, this waveform exhibits a constant, discrete positive level so long as DP−PP> +d, where d is an arbitrarily small value selected to allow the first processor 50 to position the launcher mechanism close to the final or desired position. For example, in the presently disclosed embodiment, the value for d is set at one milliradian.

So long as a constant positive signal level is produced by the output of comparator 66, the brake of actuator 22 is released and the drive motor of the actuator is operated at a nominally constant forward speed. In the disclosed embodiment, this constant speed is nominally 18 milliradians per second. While nominally a constant speed, the actual speed of the mechanism in response to a constant motor drive level, varies due to such factors as the degree of loading of carrier 14 of launcher 11, friction, wind resistance, deviations in gearing, etc.

Because the speed of turntable 20 is influenced by these factors, the predicted position signal PP takes into account the actual rate of displacement of the launcher mechanism as it is advanced toward the final position. In particular, a subtractor 61 receives the periodically updated error signal E and develops a change in error or $\Delta E$ represents the change in the error signal between successive sampling times $t_1$ and $t_2$. The $\Delta E$ signal is then divided by $\Delta t$ the sampling interval to produce a measure of the rate of approach toward the desired position, and that quantity is multiplied by $\Delta s$, representing a stopping time factor that is based on the total of the brake application time and the response time of the electronics. Since $\Delta s$ and $\Delta t$ are ordinarily constant factors, the variable $\Delta E$ is multiplied in multiplier 62 by a constant which represents the quantity $\Delta s/\Delta t$. This quantity is then added in adder 64 to the actual position signal AP to yield the predicted position signal PP, which as described above, is compared in comparator 66 to yield the actuator drive signal on output lead 60.

Figure 4:
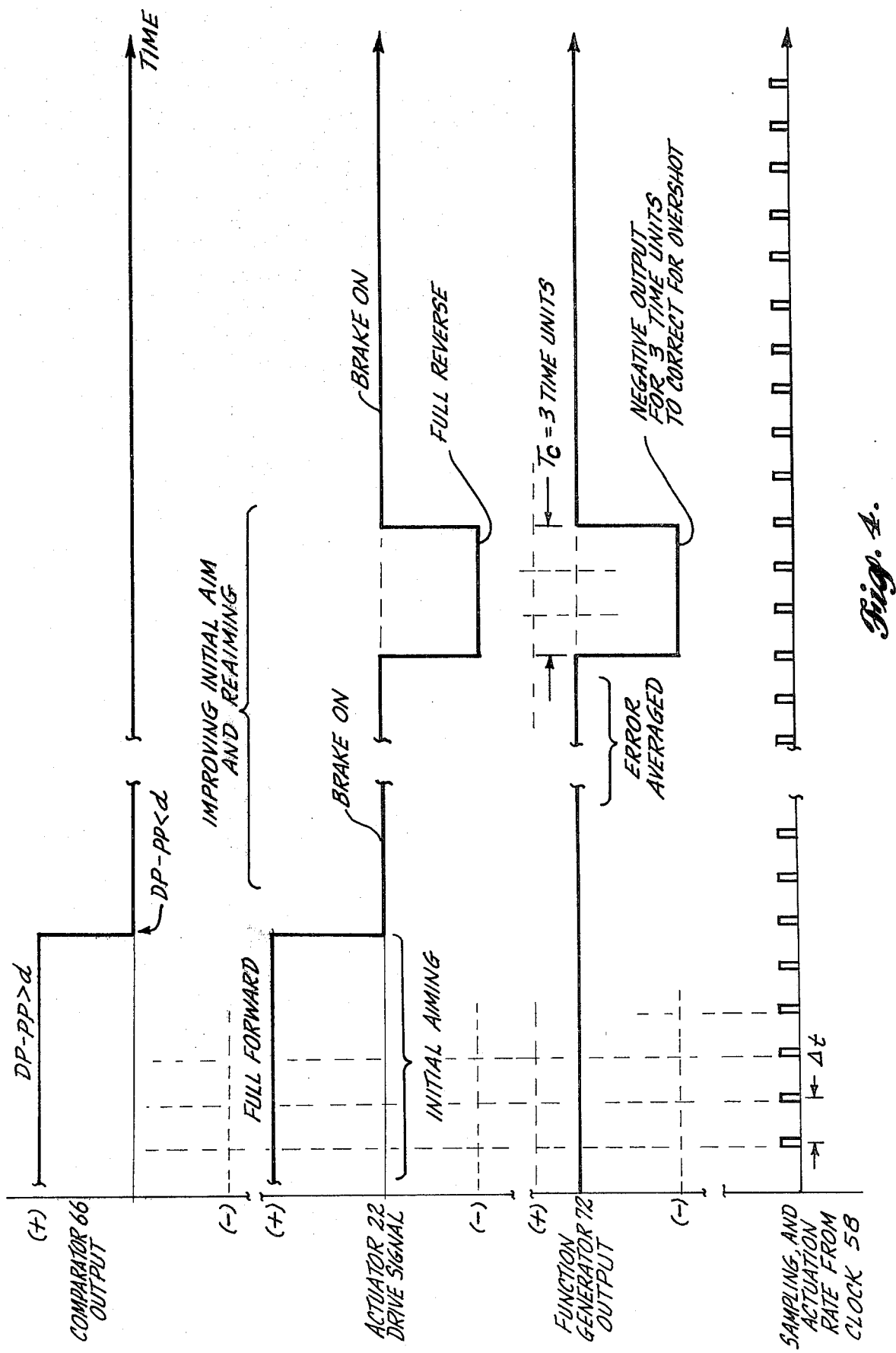
FIG. 4 is a waveform diagram illustrating, by example, the timing relationship between certain signal waveforms which occur during the operation of the control subsystem depicted in FIG. 3.

Thus, as depicted in FIG. 4, the output of comparator 66 continues to produce a steady positive level actuator drive signal until the difference between DP and PP is less than the deadband +d (i.e., when PP<DP-d) and then the actuator drive signal is caused to go to zero to stop and brake the turntable. When, at a given sampling time, the difference between DP and PP is less than +d and the stop-braked mode is initiated, the final, at rest actual position of turntable 20 may be within +d of DP, or it may overshoot the deadband by a slight amount. In either case, processor 50 has completed its task of driving the turntable 20 to position close to DP, and any remaining error is left for processor 52 to remove. In other words, there is no reactivation of processor 50 once the inequality PP<DP −d has been satisfied, and any residual position error caused by an overshoot is left for correction by processor 52. In approaching the desired position from the opposite direction, the operation is essentially the same but the signal polarities are reversed.

The transition of the output signal from comparator 66 to zero marks the end of the initial aiming operation and the enablement of the operation of the second signal processor 52 (FIG. 3). The purpose and operation of processor 52 is two-fold. Even without firing the rocket launcher, processor 52 is used after the initial aiming function of processor 50 to improve the positioning of the launcher mechanism and, thereafter, to reaim the mechanism as needed after the launcher's position has been disturbed by the firing of each rocket.

Figure 6A:
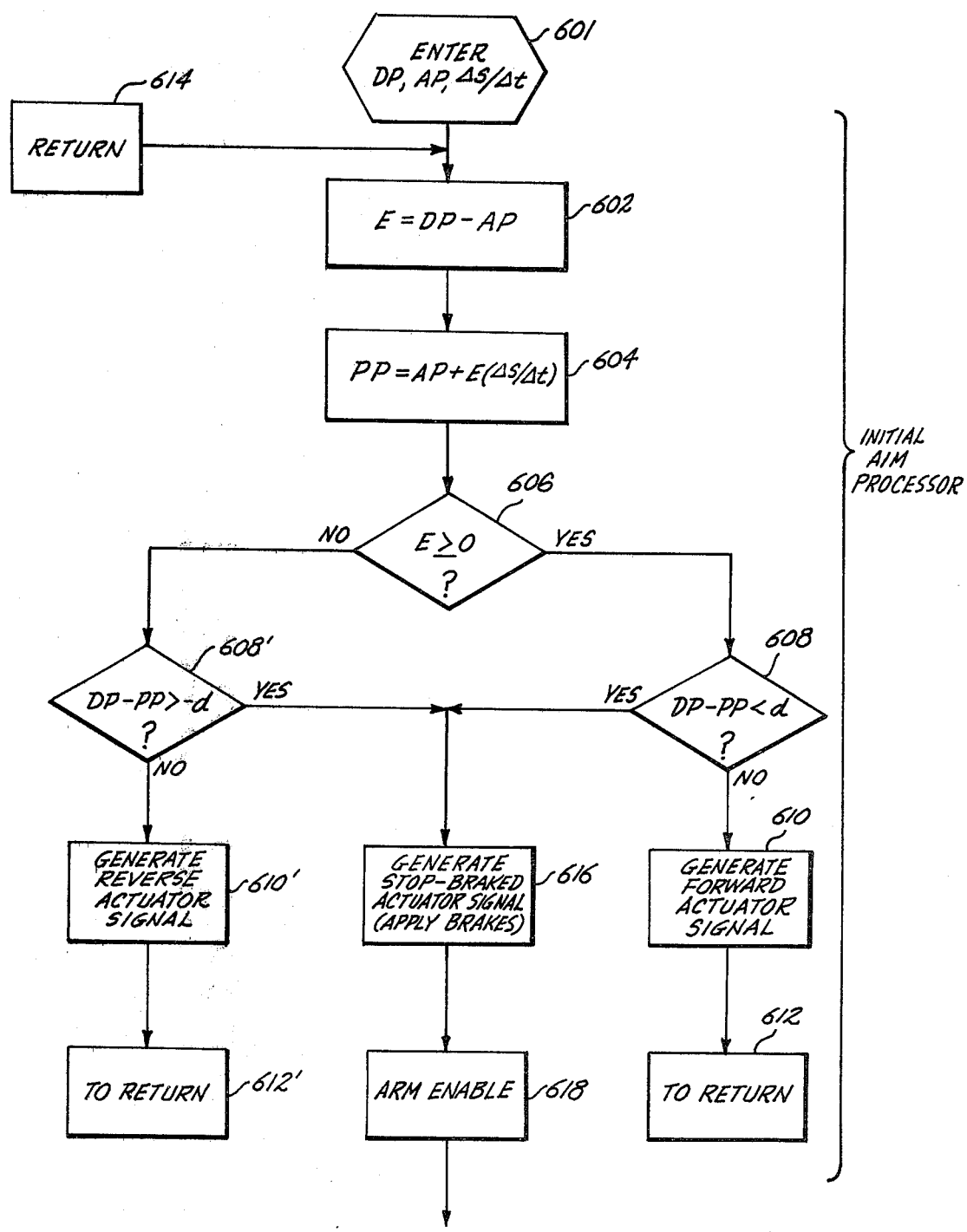
FIGS. 6a and 6b together show the flowchart for programming a general purpose microprocessor based computer to carry out the various operating functions of the control subsystem shown by the block diagram of FIG. 3.
Figure 6B:
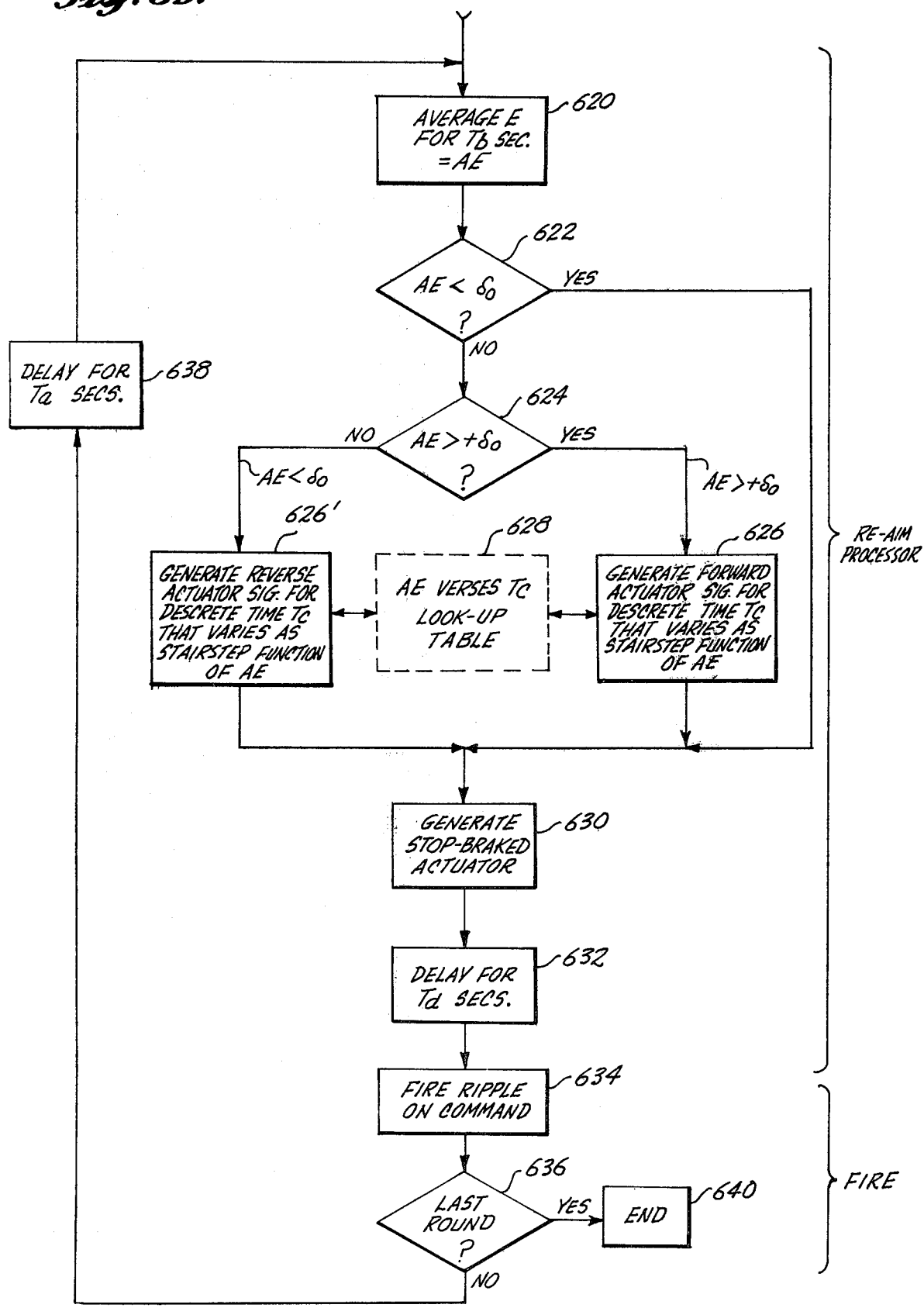

Processor 52 is activated either automatically, or on command, in the manner described herein in connection with FIGS. 6a and 6b, after processor 50 has completed the initial aiming function. Responsively, network 70 functions to average the error E available at the output of summing junction 54 during a timed interval in which the signal applied to actuator 22 is maintained at a zero level to hold the actuator brake energized and the launcher turntable 20 in a stopped-braked condition. During this timed averaging interval, the spring-mass system of launcher II (FIG. 1) may still be dynamically responding to the advancement and deceleration of the launcher turntable in response to the initial aiming processor 50. In any event, whether error E has reached a steady state under these circumstances, or is changing slightly between sampling intervals, average taking network 70 performs a time averaging operation on the error E and produces an average error AE.

The second and primary purpose of network 70 is to compute the average error AE during the decaying, natural oscillations of the launcher's spring-mass system that occur after each firing of a rocket. The operation of network 70 in this regard is explained more fully below in connection with FIG. 5.

As a result of either the above operating modes, network 70 develops a time averaged error AE which is applied to a function generator 70 that produces a discrete level signal for a discrete time duration $T_c$ which has been precorrelated to displace turntable 20 of the launcher mechanism by an amount just sufficient to remove the computed average error. As in the case of average taking network 70, the preferred implementation of function generator 72 is by way of programming a microprocessor based computer in the manner described hereinafter. Briefly, however, function generator 72 is capable of producing a constant level output, of either polarity for causing actuator 22 to advance or reverse turntable 20, in which the duration of the drive signal is limited to integral multiples of a minimum time unit. For example, a minimum time unit of 20 milliseconds, corresponding to the sampling interval, may be used for function generator 72. Depending upon the magnitude of the average error AE, function generator 72 will produce an actuator drive signal of the same positive or negative discrete level as first processor 50, for a time duration equal to one, two, three or any multiple number of the 20 millisecond minimum time unit. In the particular operating sequence illustrated by FIG. 4, the averaged error AE causes function generator 72 to produce at its output lead 74 a negative actuator drive signal of constant level for a total drive time $T_c$ of three 20 millisecond time units. The negative output is of a polarity to correct for a slight overshoot of turntable 20 of the launcher mechanism that resulted from operation of the initial aiming processor 50 as described above. At the end of the drive time $T_c$ (corresponding to the trailing edge of the final 20 millisecond time unit), the output of function generator 72 steps back up to zero, as does the actuator drive signal, causing the motor of actuator 22 to be de-energized and the turntable braked to a stop.

Figure 5:
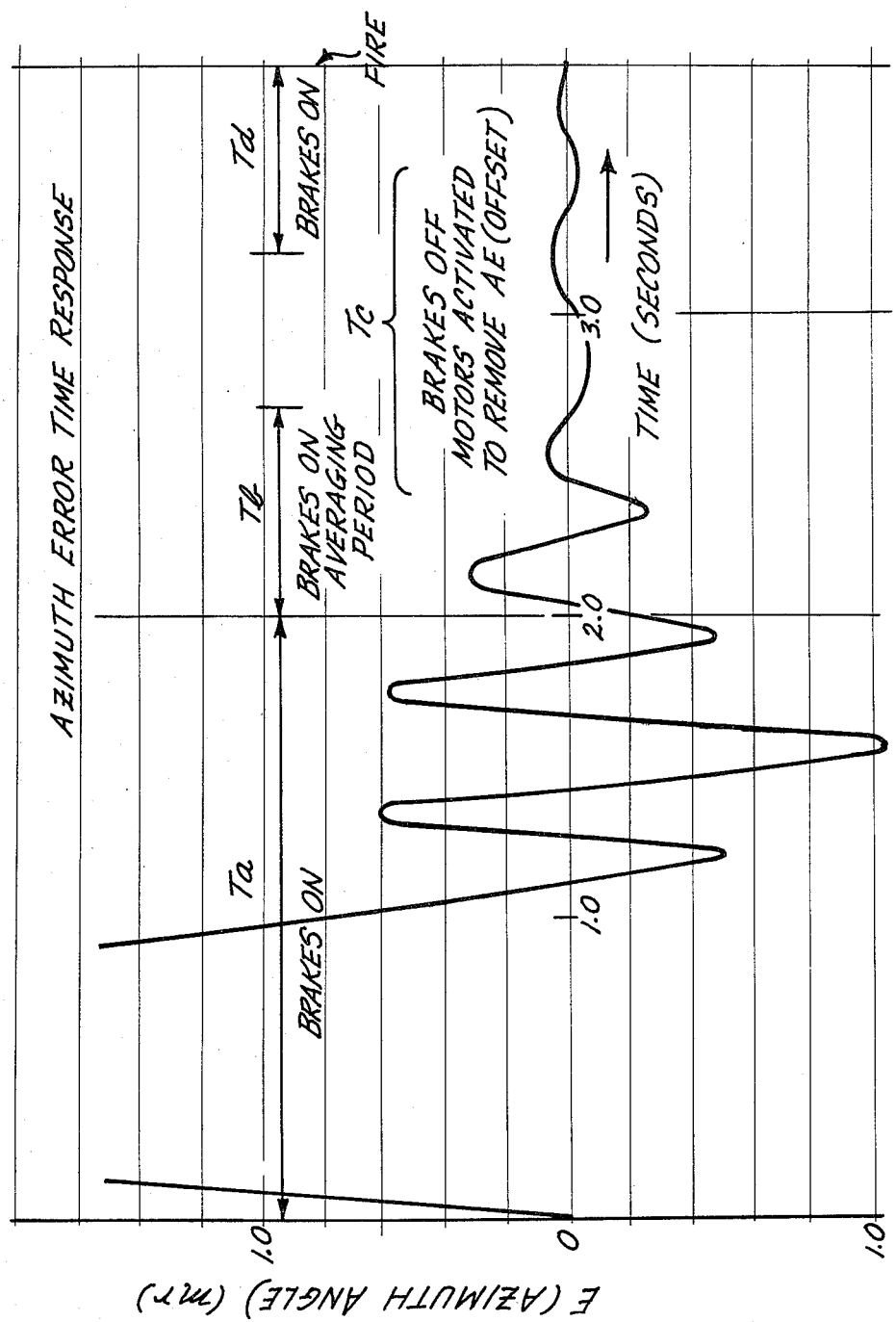
FIG. 5 is another waveform diagram illustrating the operation of an error averaging function provided in the control subsystem of FIG. 3.

The graph in FIG. 5 shows fluctuations in the azimuthal position (measured in angular milliradians) over an interval of time following a sudden disturbance, such as occurs in reaction to the firing of a rocket, to the azimuth position of launcher 11 (FIG. 1). The graph also depicts the time intervals $T_a$, $T_b$, $T_c$ and $T_d$ associated with the various phases of operation of processor 52. During the initial time interval $T_a$, timed by network 70, the output of processor 52 remains zero, causing the brakes of actuator 22 to remain energized. The azimuthal response during this first interval $T_a$, exhibits an abrupt displacement as the rocket is fired and the plume of the propelling gases impinge on carrier 14 of launcher 11 (FIG. 1). As indicated, the amplitude of this initial and abrupt transient, exceeds the vertical scale of the graph of FIG. 5. Following the initial large amplitude transient, the damped spring-mass system of launcher 11, and in particular its suspension system, enters a period of decaying, natural frequency oscillations that endure for the later part of time interval $T_a$, on through an interval $T_b$ in which the averaging network 70 is active. The time interval $T_a$ is measured by network 70 to span the strong reaction to the plume impingement and mass unloading of receiver 14, and at least one full cycle of the natural frequency oscillations. This interval is sufficient to delay the averaging operation until after the large transients have expired, and in the presently illustrated embodiment a period of 2.0 seconds was used for this purpose. As described herein in connection with FIG. 6b, the time delay $T_a$ is skipped over during the operation of processor 52, first following the initial aiming by processor 50 and before the firing of the first rocket.

After the initial delay of $T_a$, the averaging function of network 70 is activated and the time varying azimuth error E is averaged by summing the individually sampled error signal values of E updated every 20 milliseconds as described above and then dividing this total by the averaging time interval $T_b$. $T_b$ is selected to span at least two full cycles of natural frequency oscillations. By way of example, the averaging period $T_b$ in the presently illustrated embodiment was set at 0.76 seconds. During this interval, the output of processor 52 on lead 74 remains at a zero level, holding the brakes of actuator 22 energized.

At the end of the averaging period $T_b$, the computed average error AE for the azimuthal plane is applied as an input to function generator 72, which, as described above, generates a corrective actuator drive signal of discrete amplitude for a duration $T_c$ comprised of some integral multiple of a minimum time unit, e.g., 20 milliseconds. The duration $T_c$ is precorrelated to be sufficient to remove the offset determined by the computed average error AE. It is observed that during the correction interval $T_c$, that the launcher system is still undergoing some transient movement, in this case, in combined response to the earlier rocket firing and to the displacement of the launcher to correct the average error. Thus, at the end of the corrective interval $T_c$, processor 52 provides an additional delay $T_d$, during which the actuator brakes remain energized, to allow these residual transients to die out to a negligible amplitude. Then at the end of the terminal delay interval $T_d$, the rocket is fired. The foregoing sequence is repeated for reaiming the launcher followed the firing of each of a series of rockets carried in pods 32a and 32b of receiver 14 (FIG. 1).

The initial aiming and reaiming processors of EL control 44 function concurrently with, and described above for, control 40 to cause an elevation of receiver 14 that satisfies $DP_{EL}$.

PREFERRED EMBODIMENT

With reference to FIGS. 6a and 6b, the currently preferred embodiment of signal processors 50 and 52 is in the form of a microprocessor based computer programmed in accordance with the illustrated flowcharts. FIG. 6a shows the flowchart for carrying out the processing functions of the initial aiming processor 50 of FIG. 3. FIG. 6b depicts the flowchart for the aim improving and reaiming functions of processor 52 of FIG. 3.

Thus, starting at the top of the flowchart on FIG. 6a, the input values for DP, AP and the constant $\Delta s/\Delta t$ are entered in data entry block 601. Initially, the error E is computed by subtracting AP from DP in an instruction block 602, which corresponds to the function of summing junction 54 in the block diagram of FIG. 3. Following block 602, the predicted position PP value is computed and continuously updated at the sampling rate by an instruction block 604 in accordance with the expression $PP = AP + (\Delta E/\Delta t) \Delta s$.

Following instruction block 604, the program goes to a decision block 606 which determines whether the error $E > 0$ or $< 0$. From decision block 606, the program splits into two different subloops. If $E \geq 0$, a yes decision results from block 606 and the data is fed to a further decision block 608 which determines whether the predicted position PP lies within the predetermined deadband $+d$ of the desired position DP in accordance with the formula $DP - PP < d$. Initially, during the approach of the launcher mechanism, for example turntable 20, toward the desired position DP, decision block 608 will reach a negative decision indicating that the difference between DP and PP is $> d$ and the flow of the program will pass to an instruction block 610 which commands the generation of a forward actuator drive signal. The resulting actuator drive signal corresponds to the positive, discrete level drive signal produced by the output of comparator 66 of processor 50 in FIG. 3. The flow of the program then passes from block 610 to instruction block 612 commanding the flow of the program to go to return block 614, where the continuously changing data is again processed downwardly through blocks 602, 604, etc. The data continues to circulate in this particular program loop until decision block 608 determines that $DP - PP$ is $< d$, resulting in an affirmative decision which diverts the flow from block 610 and causes the actuator motor to be de-energized and the actuator brake applied by instruction block 616. Following block 616, the launcher is armed by an arm enable instruction block 618 which initiates the operation of the reaim processor portion of the control as described below in connection with FIG. 6b.

In a manner similar to the foregoing operation, if at decision block 606, it is determined that E is $< 0$, and thus, block 606 yields a negative decision, then the flow proceeds to decision block 608', operates like the abovedescribed operation of block 608, to determine whether the difference between DP and PP is $> -d$, or in other words, greater than the negative value of the pre-established deadband value d. If it is not $> -d$, then the predicted position is not sufficiently close to the desired position and a negative decision from block 608' causes decision block 610' to generate a reverse actuator signal and to continue in this subloop through return block 612' until an affirmative decision is available from block 608'. When this decision is affirmative, then the flow proceeds from block 608' to the instruction block 616 where the stop-braked actuator signal is generated to de-energize the actuator motor and apply the brakes. Thereafter, arm enable block 618 enables the rocket launcher for firing and the position control proceeds to the reaim processor set forth in FIG. 6b.

With reference to FIG. 6b, the enable condition received from the initial aiming processor of 6a proceeds to a first instruction block 620 for averaging the error E. The values of E that exist during the interval $T_b$ (described above in connection with FIG. 5) are accumulated and divided by the interval $T_b$ to compute the average error AE.

Then the flow proceeds to a decision block 622 where AE is compared with the absolute value of a pre-established deadband $\delta_o$. The value for $\delta_o$ is chosen to be small enough so that if the average error AE is $< \pm\delta_o$, no further improvement of the aiming, or reaiming, is required. In this embodiment, $\delta_o$ is set at 1 milliradian. If block 622 produces an affirmative decision, the processing flow skips over a series of decision and instruction blocks that carry out the operations of function generator 72, as described above in connection with FIG. 3. If, on the other hand, it is determined that the average error AE is greater than the absolute value of $\delta_o$, then block 622 produces a negative decision and the flow proceeds to another decision block 624 that decides whether $AE > +\delta_o$. If yes, then block 624 produces an affirmative decision and the flow passes on to a forward actuation instruction block 626. Here, the actuator 22 for turntable 20 (see FIG. 3) is commanded to operate in a forward direction for a discrete time $T_c$ that varies as a stair step function of the computed AE. The level of the drive signal is a discrete value, as described above in connection with the operation of processors 50 and 52 of FIG. 3. The duration $T_c$ varies incrementally in accordance with an AE versus $T_c$ look-up table 628 which correlates certain minimum and maximum ranges of AE with certain integral multiples of a minimum actuator time. As a result, the duration of the forward actuator signal increases, but in a stepwise discontinuous fashion, as the average error AE increases. The operation and cooperation of instruction block 626 and look-up table 628 are explained more fully hereinafter in connection with a preferred subroutine for adaptive generation of look-up table 26, which insures accurate correlation between the duration $T_c$ of the actuator signal and the average error offset that is to be corrected by decision block 626.

In a similar manner, if block 624 produces a negative decision then AE is $< -\delta_o$, and instruction block 626' cooperates with the same look-up table 628 and generates a reverse actuator signal of discrete magnitude for a duration $T_c$ that also varies as the same stair step function of the magnitude of the average error, although in this instance, the average error AE is of a negative polarity.

Following the instructions of either block 626 or 626', or an affirmative decision from block 622, the flow proceeds to instruction block 630 which commands the actuator to assume the stop-braked mode. Thereafter, a block 632 requires a delay of $T_d$ seconds in the reaim processing and, thereafter, an instruction block 634 disposes the launcher control system in a condition ready for firing a sequence of rockets (called a ripple) on command. Each rocket of the ripple is fired automatically after the initial command is entered at decision block 634. After the first rocket is fired, the flow passes through a decision block 636. Here, it is determined whether the last rocket has been fired, and if not, (as in the present example), a negative decision causes the flow to pass on to a delay instruction block 638. A delay of $T_a$ seconds is inserted here, corresponding to the delay interval $T_a$ described above in connection with FIG. 5, for allowing the large amplitude transients of the launcher to pass before attempting to average the natural frequency oscillations. After the initial delay interval $T_a$, the flow returns to instruction block 620 where the transient error E is averaged as described above to make an accurate and early determination of the magnitude and sense of the error before the transients of the launcher system have fully decayed to zero. Each rocket available in carrier 14 (FIG. 1) is thus launched automatically in succession, until decision block 636 determines that the last round has been fired, and in that case, an affirmative decision causes the proessor flow to end at block 640, awaiting reloading and resetting of the system.

Figure 7:
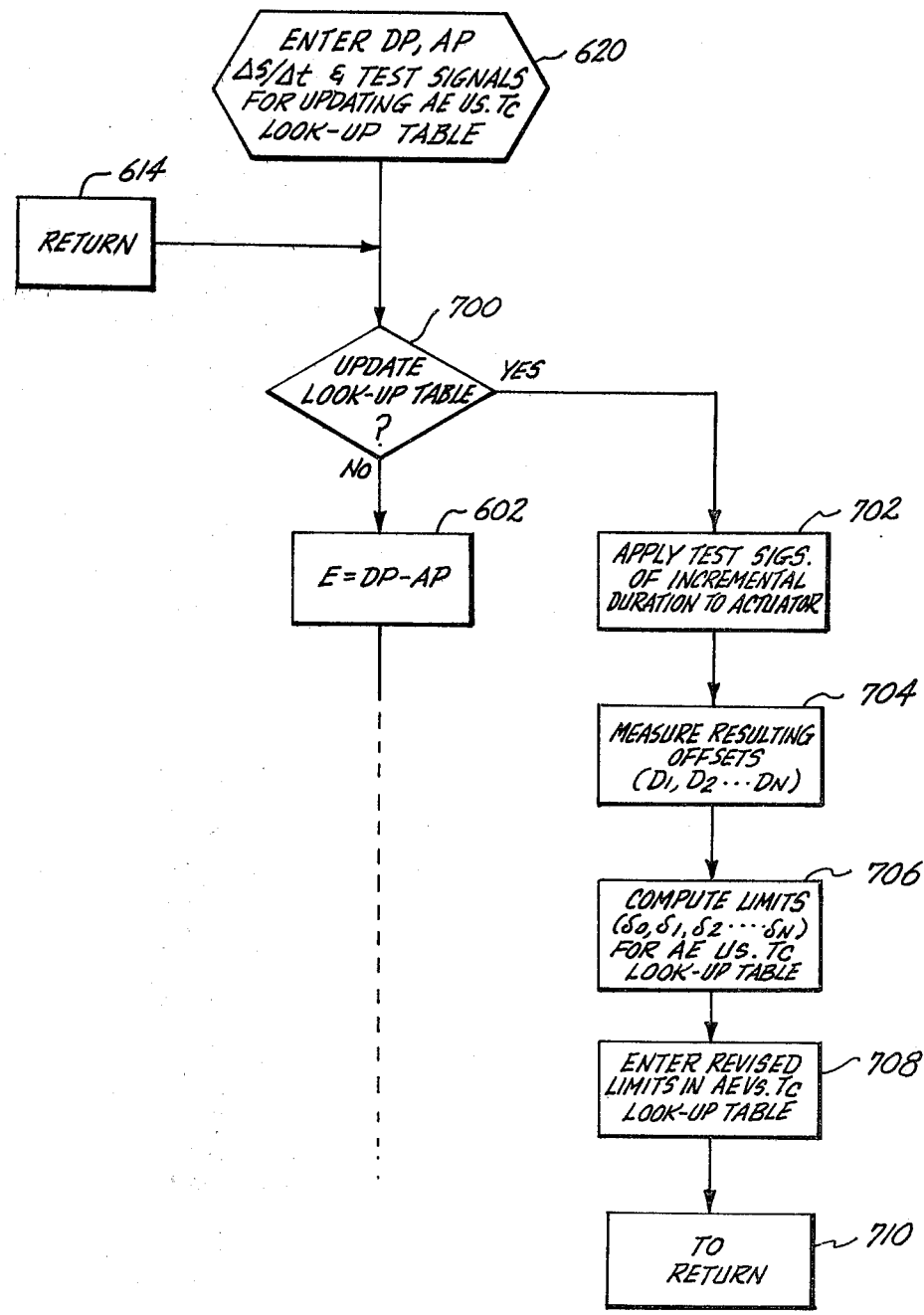
FIG. 7 is a flowchart illustrating a preferred addition to the program shown in FIGS. 6a and 6b.
Figure 8:
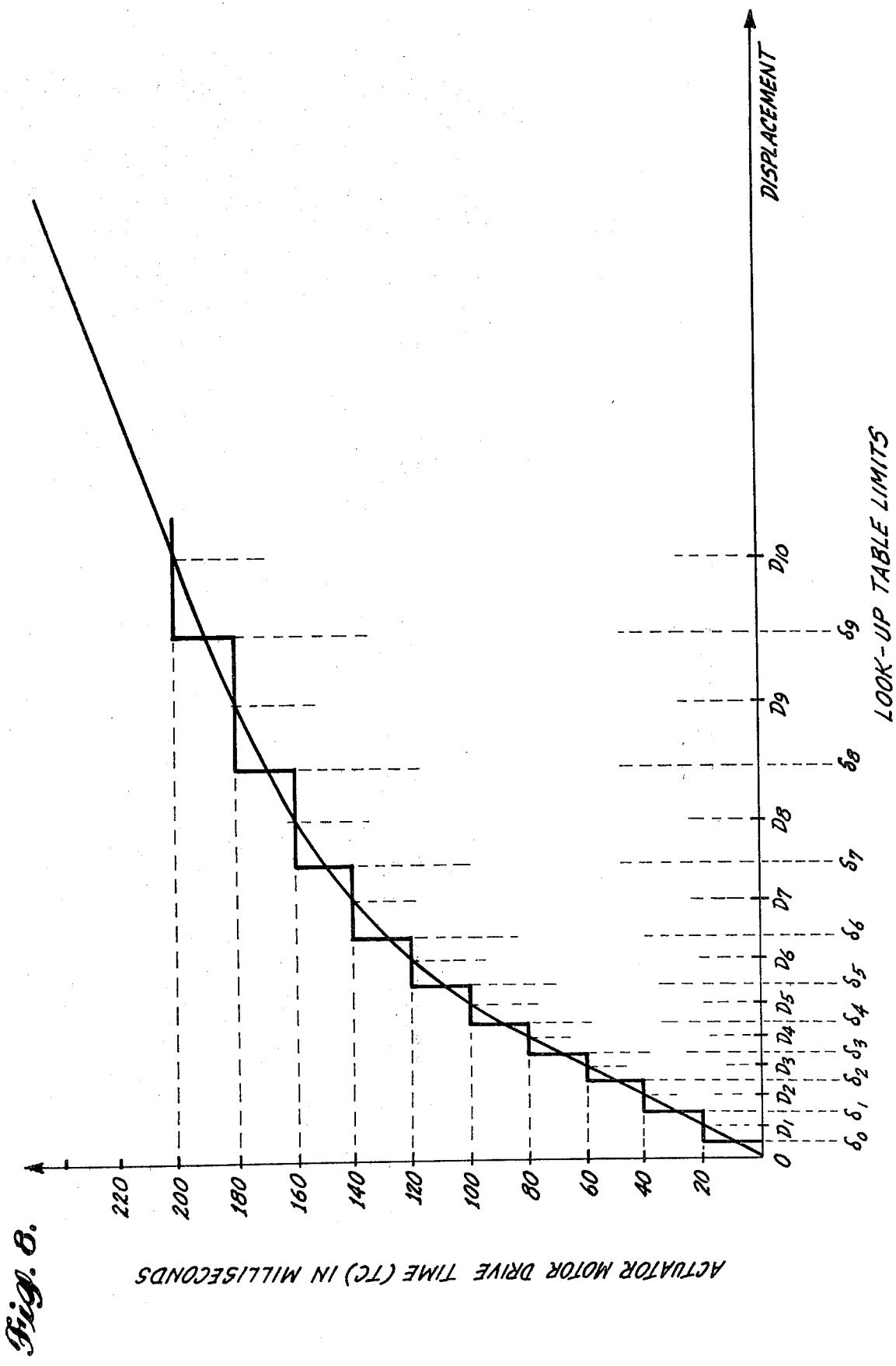
FIG. 8 is a graph associated with the operation of the subsystem in accordance with the flowchart of FIG. 7 and plotting an actuator drive time parameter versus a time averaged error parameter AE.

With reference to FIG. 7, the preferred implementation of the invention further incorporates a subroutine, not shown in the flowchart of FIGS. 6a and 6b, for carrying out an adaptive generation of the AE versus $T_c$ values stored in look-up table 628 (FIG. 6b). In principle, the adaptive generation routine shown in FIG. 7, and explained more fully herein in conjunction with the graph of FIG. 8, is employed to insure that the look-up table 628 contains current values for precise correlation between the computed average error AE and the required actuator signal duration $T_c$ needed to remove such error. Although, ideally, the actuator motors for rotating and elevating the launcher carrier 14 are operated at constant drive levels and thus should produce predictable displacements of the associated launcher mechanisms, nevertheless wear and changing environmental conditions affect the degree of correlation between the average error and the actuator signal duration $T_c$. By updating look-up table 628 from time to time using the adaptive generation routine shown in FIG. 7, changes in the actuator motor response and braking characteristics are automatically precorrelated for more precision control over the launcher mechanism. Also, the adaptive generation of look-up table 628 allows for recorrelation of the AE versus $T_c$ look-up values when the actuator motors and brake assemblies are exchanged, to compensate for differences in the motor response and brake characteristics between the old and the newly installed actuator components.

Thus, with reference to FIG. 7, data entry block 620 provides for receiving not only DP, AP, $\Delta s/\Delta t$, but also test signals for updating the AE versus $T_c$ look-up table. Between data entry block 620 and instruction block 602 which computes the error E, a decision block 700 is interposed in the flowchart for initiating the updating of the look-up table, either automatically, or as in the presently disclosed and preferred embodiment, at a time commanded by an operator. For example, decision block 700 may be a manually operated switch having one position for activating the update subroutine and a normal position for skipping this subroutine. If the decision by block 700 is negative, the update subroutine is skipped and the program flow proceeds to instruction block 602 and thence to the remaining decision and instruction blocks of the principal aiming and reaiming routines shown in FIGS. 6a and 6b.

If, on the other hand, an affirmative decision is made at block 700, then the flow of the program proceeds to a first instruction block 702 of the update subroutine by which a sequence of test signals of incremental duration are applied to the associated actuator, such as actuator 22 for the azimuth position as shown in FIG. 1. Following the application of each of these incremental test signals, which are applied in a manner described more fully below in connection with FIG. 8, the resulting offsets $D_1$, $D_2$-$D_n$ in the displaced launcher mechanism, which in this example would be turntable 20, are measured by instruction block 704. Instruction block 704 simply measures the change that occurs between the actual position ($AP_1$) as it existed prior to the applied test signal, and the actual position ($AP_2$) that results following the displacement caused by the applied test signal. In this manner, a series of resulting offsets $D_1$, $D_2$ through $D_n$ are measured and stored in memory.

Following instruction block 704, a succeeding instruction block 706 computes limits of $\delta_0$, $\delta_1$, $\delta_2$-$\delta_n$ for the AE versus $T_c$ look-up table. These computed limits corelate the required integral number of actuator signal times $T_c$ needed to remove the offset as determined by the computed average error. The computation of limits $\delta_0$, $\delta_1$, $\delta_2$-$\delta_n$ from the measured offsets $D_1$, $D_2$-$D_n$ is explained more fully below in connection with FIG. 8.

After the computation of the limits carried out by instruction block 706, the resulting values if new, or revised, are entered in the AE versus $T_c$ look-up table 628 as shown and described above in connection with FIG. 6b. After all of the limits have been thusly computed and entered into table 628, instruction block 710 causes the subroutine to return via return 614 to the beginning of the main processor routine.

FIG. 8 is a plot of the actuator motor drive time $T_c$ as a function of the resulting displacement $D_1$, $D_2$-$D_n$ of the launcher mechanism. It is observed that for small angles of displacement 0 through about $D_8$, there is a nonlinear change in angular displacement as a function of actuator motor drive time $T_c$. Thereafter, the variation approaches linearity as indicated by the constant slope of the plot. In generating the offsets $D_1$-$D_n$, instruction block 702 of the subroutine depicted in FIG. 7 first causes an actuator drive time equal to the minimum time unit, or in this instance, 20 milliseconds. The resulting displacement $D_1$ is then measured and stored in memory. Thereafter, an actuator signal having a duration of two minimum time units or, in this instance, 40 milliseconds is produced and the difference between the starting actual position and the terminal actual position is registered as $D_2$. In this manner, the various displacements $D_3$-$D_n$ are measured for the various multiples of 20 millisecond time increments as shown on the vertical scale of FIG. 8. Having stored in memory the values for $D_1$-$D_n$, the offset limits $\delta_0$-$\delta_n$ are computed in accordance with the following relationships:

$\delta_0 = D_1/2$ (which, in the present embodiment is set at 1 milliradian)     (1)

$\delta_1 = D_1 + (D_2 - D_1)/2$     (2)

$\delta_2 = D_2 + (D_3 - D_2)/2$     (3)

$\delta_n = D_n + (D_{n+1} - D_n)/2$     (n)

Each time the look-up table is updated in accordance with the subroutine of FIG. 7 and the diagram of FIG. 8, new values for displacements $D_1$-$D_8$ are measured. For displacements $> D_{10}$, knowledge of the constant slope of the plot shown in FIG. 8 is used to simplify the generation of values for displacement $> D_{10}$ and the associated limits in excess of $\delta_9$. In other words, this constant slope of time versus displacement plot in FIG. 8 is determined by computing the ratio of the difference in displacement, for example, between $D_8$ and $D_{10}$ and the corresponding difference in actuator time between 160 milliseconds and 200 milliseconds or 40 milliseconds. Thus the ratio of $D_{10}$-$D_8$ divided by 40 milliseconds establishes the slope of the time versus displacement plot from which any higher order displacement values $D_n$ and their corresponding look-up table limits $\delta_n$ may be readily computed so as to minimize, if desired, the number of displacement measurements.

It is assumed that the response of the mechanism to the actuator drive motor is essentially the same in both the forward and reverse directions. Thus, a single set of look-up table limits $\delta_0$-$\delta_n$ is used for setting the actuator motor drive time $T_c$ for both the forward actuator signal (instruction block 626 of FIG. b) and the reverse actuator signal (instruction block 626' of FIG. 6b). Look-up table 626 is updated, in the foregoing manner, as frequently as practical and preferably at least between firing of each full load of rockets carried in receiver 14 (FIG. 1). Additionally, the table needs to be updated each time a component of the drive mechanism, such as the actuator motor and/or brake modules, is exchanged.

It is thus seen that the above-disclosed preferred embodiment of the invention provides for quickly and accurately aiming the launcher mechanism, without requiring substantial actuator drive power to acquire and hold the aim. In other words, the electrical power used in energizing the azimuth and elevation drive motors is used to the maximum efficiency by displacing the azimuth and elevation mechanisms toward their desired position, and then immediately and abruptly de-energizing the actuator motors. Furthermore, the averaging function of processor 52 and the preferred implementation thereof carried out by instruction block 620 of the flowchart shown in FIG. 6b, enable an early determination of the error in the aiming of the launcher shortly after each rocket has been fired. By averaging out the natural frequency transients, an accurate net error is made available at an early time for activating the Az and El actuators by means of function generators corresponding to generator 72 of processor 52, and preferably by means of the signal processing set forth in the flowchart of FIG. 6b, to remove the corresponding error offset. The launcher is thus reaimed for firing the next round at a time significantly sooner than would be possible if the amount of required correction could be determined only after the launcher transients had decayed to zero. Further still, the foregoing preferred embodiment of the invention provides for the adaptive generation of the look-up table values that determine the required actuator signal drive time $T_c$. By adpative generation of the look-up table values in the manner disclosed above, prior determination of the motor-brake characteristics as a function of duration of the applied actuator signal, enables the system to provide precise correlation between the measured average error or offset and the duration of the actuator signal $T_c$ needed to remove that offset.

While only particular and preferred embodiments have been disclosed herein, it will be readily apparent to persons skilled in the art that numerous changes and modifications can be made thereto, including the use of equivalent means, devices and method steps without departing from the spirit of the invention.

As one example of such modifications, it has been proposed that the AE versus $T_c$ look-up table G28 (FIG. 6b) be adaptively generated (updated) during each active mode of the initial aiming processor 50 (FIGS. 3 and 6a). During the operation of processor 50 to effect coarse positioning of the turntable 20 (or the operation of the counterpart of processor 50 in EL control 44), the components of the total displacement produced by an actuator drive signal of given duration are measured and stored. These components include a position displacement resulting from and during a steady state actuator drive signal, and additional position displacement resulting from the stopping distance that is traveled after termination of the drive signal. The drive signal displacement component is obtained by measuring, in processor 50, the steady state drive rate equal to the change in AP; or $\Delta P$ over one or more sampling intervals $\Delta t$. With the assumption that $\Delta P/\Delta t$ approximates the drive rate for all the $T_c$ intervals, both short and long, a series of time versus change of position values for this component of total displacement, are generated as follows: $\Delta P$, $\Delta P_2$, $\Delta P_3$ ... Then, to this displacement component, the stopping distance component $\Delta P_s$ is added, to yield a table of $T_c$ versus total displacement values, as follows:

| | | |
|---|---|---|
| $T_{c1}$ | = | $\Delta P_1 + \Delta P_s$ |
| $T_{c2}$ | = | $\Delta P_2 + \Delta P_s$ |
| $T_{c3}$ | = | $\Delta P_3 + \Delta P_s$ |
| | — | |
| | — | |
| $T_{cn}$ | = | $\Delta P_n + \Delta P_s$ |

It is noted that both the $\Delta P_n$ and $\Delta P_s$ components can vary from time to time because of such factors as temperature, dampness, wear and other environmental conditions, and the control system will adapt to these changes each time the initially aiming processor is active.

The embodiments of the invention in which an exclusive property or privilege is claimed are defined as follows:

1. A control apparatus for positioning a dynamically controlled mechanism having at least a first axis of controlled movement, comprising in combination:
   actuator means operatively associated with said controlled mechanism and having forward and reverse drive modes for displacing said mechanism with respect to said first axis of movement and having a stop mode;
   position sensing means operatively associated with said controlled mechanism for producing an actual position signal (AP) representing the actual position of said mechanism with respect to said first axis of movement:
   signal source means for producing a desired position signal (DP) representing a desired position for said controlled mechanism with respect to said first axis of movement;
   summing means connected to receive the AP and DP signals, said summing means producing an error signal (E) representing the difference between the AP and DP signals;
   first and second signal processors connected between said summing means and said actuator means, said first signal processor comprising the subcombination of:
   (a) means for producing a predicted position signal (PP) in response to the AP signal and a constant factor related to a stopping distance of said controlled mechanism when said actuator means is caused to change from one of said drive modes to said stop mode;
   (b) comparator means for comparing the PP signal with the DP signal and producing an actuator drive signal at an output thereof that disposes said actuator means in one of said drive modes so long as the difference between the DP and PP signals is greater than a predetermined difference threshold, and that disposes said actuator means in said stop mode when the difference between the DP and PP signals is less than said threshold;
   said second signal processor comprising the subcombination of:
   (c) signal averaging means for taking a time average of said error signal E, means for activating said averaging means after said comparator means of said first signal processor has produced an actuator drive signal disposing said actuator means in said stop mode, and said averaging means having an output producing a time averaged signal (AE) representing a time average of the error signal E; and,
   (d) function generator means having an input connected to the output of said signal averaging means for producing an actuator drive signal in response to the signal AE for disposing said actuator means in one of said drive modes, depending on the sense of the signal AE, for a duration, $T_c$ that varies as a predetermined function of the magnitude of the signal AE for removing a steady state position error corresponding thereto.

2. The control apparatus of claim 1, wherein said function generator means of said second signal processor comprises:
   memory means for storing a set of values of ranges of the signal AE and a corresponding set of values for the required time duration $T_c$ needed to remove the steady state errors associated with such set of AE signal ranges;
   means for retrieving said values of time duration $T_c$ in response to the signal AE; and,
   adaptive generation means for generating revised values of the ranges of the AE signal and corresponding time duration $T_c$, and means for updating said memory means with said revised values.

3. The control apparatus of claim 2, wherein said adaptive generation means comprises means for generating a series of actuator drive test signals and means for measuring the correlative differences in the actual position signal AP resulting from the displacements of the controlled mechanism.

4. The control apparatus of claim 1, wherein said controlled mechanism is an aimable device that fires a succession of projectiles and has a transient and a steady state displacement in reaction to each firing, and further comprising means for activating said signal averaging means and said function generator means of said second signal processor following each said firing to remove said steady state displacement caused by said reaction thereto.

5. The control apparatus of claim 4, wherein said second precessor comprises delay means for delaying the operation of said signal averaging means for a predetermined delay interval $T_a$ following each said firing so as to exclude an initial portion of said transient displacement of said mechanism from the time averaging of the signal AE.

6. The control apparatus of claim 5, wherein said means for activating said signal averaging means includes timing means for causing said averaging means to take said time average of the signal AE over an averaging interval $T_b$ that follows said delay interval $T_a$, said averaging interval $T_b$ being preselected to encompass at least one full cycle of oscillations of said mechanism occurring during a second portion of said transient displacement.

7. The control apparatus of claim 1, wherein said actuator means comprises an electrically operated drive motor and an electrically operated brake, said motor being energized and said brake being released during said drive modes, and said motor being de-energized and said brake applied during said stop mode, and wherein said drive signals produced by said first and second processors causing said motor to be driven at a constant speed in said drive modes.

8. The control apparatus of claim 1, wherein said means of said first processor for producing said predicted position signal (PP) comprises means for measuring the rate $\Delta E/\Delta t$ of approach of the mechanism toward the desired position and means for multiplying said rate $\Delta E/\Delta t$ by a stopping time factor $\Delta s$ representing a predetermined constant time interval.

9. The control apparatus of claim 1, wherein said position sensing means comprises means for periodically sampling said position at a predetermined sampling interval, and said actuator means comprises means for responding to said motor drive signals from said first and second processors at periodically reoccurring activation times.

10. In a control apparatus for positioning a dynamically controlled unit that has at least a first axis of controlled movement and including actuator means operatively associated with said controlled unit and having forward and reverse drive modes for displacing said unit with respect to said given axis and having a stop mode, and means for producing an error signal (E) representing the difference between a desired and an actual position of said controlled unit, wherein the improvement comprises a signal processor connected to receive said error signal E for responsively producing an actuator drive signal for selectively disposing said actuator means in one of said modes, and wherein said signal processor comprises a signal averaging means for taking a time average of said error signal E for a predetermined time interval to develop a discrete time averaged error signal (AE); and a generator means having an input connected to said averaging means and having an output at which said actuator drive signal is produced, said drive signal being responsive to the signal AE for disposing said actuator means in one of said modes for a discrete time interval that depends on the sense and magnitude of the signal AE for removing a steady state position offset relative to the desired position.

11. A control apparatus for positioning a dynamically controlled unit having at least a first axis of controlled movement, comprising in combination:
actuator means operatively associated with said controlled unit and having discrete speed, forward and reverse drive modes for displacing said unit with respect to said first axis and having a stop mode;
position sensing means operatively associated with said controlled unit for producing a signal (AP) representing the actual position of said unit with respect to said first axis;
signal source means for producing a signal (DP) representing a desired position for said controlled unit with respect to said first axis;
summing means connected to receive the AP and DP signals, said summing means producing an error signal (E);
first and second signal processors connected between said summing means and said actuator means, said first signal processor comprising the subcombination of:
(a) means for producing a predicted position signal (PP) in response to the AP and E signals and a constant factor related to a stopping time of said controlled unit that transpires when said actuator means undergoes a transition from one of said drive modes to said stop mode;
(b) comparator means for comparing said signal PP and said signal DP, said comparator means having output means that has first, second and third discrete actuator drive signal conditions, said comparator means assuming said first signal condition at its output when said signal DP exceeds said signal PP by an amount greater than a predetermined deadband, and assuming said second signal condition when said signal DP is less than said signal PP by an amount greater than said deadband, and assuming said third signal condition when the difference between the signals DP and PP lies within said deadband;
said second signal processor comprising the subcombination of:
(c) signal averaging means for taking a time average of said error signal E over a predetermined interval $T_b$, said averaging means being activated when said output of said comparator means of said first signal processor assumes said third signal condition, and said averaging means having an output at which a signal (AE) is produced representing a time average of said error signal at the end of said predetermined interval $T_b$; and,
(d) function generator means having an input connected to the output of said averaging means and having output means that has first, second and third discrete actuator drive signal conditions corresponding to said first, second and third signal conditions of said comparator means of said first processor, said function generator means normally assuming said third actuator drive signal condition and being responsive to said averaging means so as to assume said first actuator drive signal condition when the average error signal AE is less than a predetermined negative threshold value and to maintain said first actuator drive signal condition for a time interval that varies as a function of the magnitude of said average error AE and so as to assume said second actuator drive signal condition when the average error signal AE is greater than a predetermined positive threshold level and to maintain said second signal condition for a time interval that varies as a function of the magnitude of said average error AE and then resuming third actuator drive signal condition; and, combining means for combining the actuator drive signal conditions of said first and second processors, said actuator means assuming said forward speed mode when either of said output means of said comparator means or said function generator means is in said first signal condition, and assuming said reverse speed mode when either of said output means of said comparator means or said function generator means is in its second signal condition, and assuming said stop mode when both said output means of said comparator means and said function generator means are in their first signal conditions.

12. A method of controlling the position of a dynamically controlled mechanism wherein a mechanism actuator is selectively operated in forward or reverse drive modes or a stopped mode by an actuator drive signal developed in response to signals representing desired position (DP), actual position (AP) and a position error (E) which is the difference between signals DP and AP, comprising the steps of:

initially processing said DP, AP and E signals to effect a coarse positioning of said mechanism, the step of initially processing said signals comprising the substeps of:

producing a predicted position signal (PP) that represents the actual position AP plus an additional factor representing a stopping distance of the mechanism when said actuator is caused to change from one of said drive modes, to said stop mode; and comparing the predicted position signal PP with the DP signal, and producing actuator drive signal that drives the actuator in one of its drive modes so long as the difference between the signals DP and PP is greater than a predetermined difference threshold, and producing an actuator drive signal that causes the actuator to assume its stop mode when the difference between the DP and PP signals is less than said threshold; and subsequently processing said signal E to effect an improvement of said coarse positioning, comprising the substeps of:

receiving and taking an average of said signal E over a predetermined time to produce a discrete time average error signal (AE), and generating an actuator drive signal in response to said average error signal AE for causing said actuator to assume one of said drive modes, depending on the sense of the signal AE, for a discrete duration $T_c$ that is a predetermined function of the magnitude of the signal AE for removing an offset error in position that remains after said coarse positioning performed by the initial processing of said signals.

13. The method set forth in claim 12 wherein the subsequent signal processing further comprises the substeps of:

electronically storing a set of values of predetermined ranges of the signal AE and a set of corresponding values for the required time duration $T_c$ needed to remove offset errors associated with said ranges of the signal AE;

retrieving said values of time duration $T_c$ in response to the signal AE produced by said step of averaging the error signal E;

adaptively generating revised values of the ranges of the signal AE and the values of time duration $T_c$ corresponding thereto; and updating the values of said ranges and time duration that have been previously stored as a result of the above said step of electronically storing.

14. In a method of positioning a dynamically controlled unit that has at least a first axis of controlled movement and includes operating an actuator for displacing said controlled unit in forward and reverse drive modes, and for stopping said unit when in a stop mode, and wherein an error signal (E) is produced for representing a difference between a desired position (DP) and an actual position (AP) of said controlled unit, the improvement in said method comprising the steps of:

receiving and averaging said error signal E over a predetermined time interval to develop a discrete time averaged error signal (AE); and generating an actuator drive signal in response to said time average error signal AE in which the generated actuator drive signal is effective to dispose said actuator means in one of said drive modes depending on the sense of said time averaged error signal AE and to maintain said actuator means in such a drive mode for a discrete duration that is related to the magnitude of the time averaged error signal AE in order to remove a steady state position error corresponding thereto.

15. In the method of claim 14, wherein said controlled unit is an aimable device for firing a succession of projectiles and exhibits transient and steady state displacement in reaction to each firing, and further comprising the step of timing said step of averaging so that said predetermined time interval during which said error signal E is averaged occurs during a period of said transient displacement of said device.

* * * * *

UNITED STATES PATENT AND TRADEMARK OFFICE
CERTIFICATE OF CORRECTION

PATENT NO. : 4,302,666

DATED : November 24, 1981

INVENTOR(S) : Patrick J. Hawkins

It is certified that error appears in the above-identified patent and that said Letters Patent are hereby corrected as shown below:

Column 1, following the title of the invention and before "Background of the Invention" add:

--STATEMENT OF GOVERNMENT INTEREST

The government has rights in this invention pursuant to Contract No. DAAK-40-77-C-0162 awarded by the United States Army.--

Signed and Sealed this

Thirtieth Day of March 1982

[SEAL]

Attest:

Attesting Officer

GERALD J. MOSSINGHOFF

Commissioner of Patents and Trademarks